US012523043B2

(12) United States Patent
Kalmar et al.

(10) Patent No.: US 12,523,043 B2
(45) Date of Patent: Jan. 13, 2026

(54) STAIRCASE WITH INSTRUMENTED STEPS WITH LIFTING ACTUATOR FOR ASSISTED ASCENT OR DESCENT

(71) Applicant: COMMISSARIAT A L'ENERGIE ATOMIQUE ET AUX ENERGIES ALTERNATIVES, Paris (FR)

(72) Inventors: Rémy Kalmar, Grenoble (FR); Manuel Fendler, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 215 days.

(21) Appl. No.: 18/248,759

(22) PCT Filed: Sep. 10, 2021

(86) PCT No.: PCT/EP2021/074999
§ 371 (c)(1),
(2) Date: Apr. 12, 2023

(87) PCT Pub. No.: WO2022/078680
PCT Pub. Date: Apr. 21, 2022

(65) Prior Publication Data

US 2023/0399852 A1 Dec. 14, 2023

(30) Foreign Application Priority Data

Oct. 16, 2020 (FR) .................................... 20 10599

(51) Int. Cl.
*E04F 11/104* (2006.01)
*B66B 1/30* (2006.01)
(Continued)

(52) U.S. Cl.
CPC ............ *E04F 11/1041* (2013.01); *B66B 1/30* (2013.01); *B66B 1/3476* (2013.01); *B66B 5/0012* (2013.01); *B66B 9/0869* (2013.01)

(58) Field of Classification Search
CPC ....... B66B 1/30; B66B 1/3476; E04F 11/1041
See application file for complete search history.

(56) References Cited

U.S. PATENT DOCUMENTS 5,802,773 A * 9/1998 Pingel .................. B66B 9/0869 52/10
10,975,574 B2 * 4/2021 Liu .................... E04F 11/1863
(Continued)

FOREIGN PATENT DOCUMENTS

CN 105565113 A 5/2016
CN 105565113 B * 10/2017
(Continued)

OTHER PUBLICATIONS

International Search Report issued Nov. 5, 2021 in PCT/EP2021/074999 filed on Sep. 10, 2021, 3 pages.
(Continued)

*Primary Examiner* — Joshua K Ihezie
(74) *Attorney, Agent, or Firm* — Oblon, McClelland, Maier & Neustadt, L.L.P.

(57) ABSTRACT

The invention relates to a system for assisted ascent or descent, comprising: —a staircase comprising at least one instrumented mobile step, equipped with at least one sensor for measuring the centre of pressure of a user and at least one lifting actuator designed to raise or lower the step according to a degree of vertical freedom; —a calculation unit connected to the sensor for measuring the centre of pressure and to the lifting actuator, the calculation unit being configured to calculate at least the position, the speed of movement and the acceleration of the user from the centre of pressure
(Continued)

measured by the sensor and, depending on the values calculated, control the lifting actuator.

10 Claims, 7 Drawing Sheets

(51) Int. Cl.

| | |
|---|---|
| ***B66B 1/34*** | (2006.01) |
| ***B66B 5/00*** | (2006.01) |
| *B66B 9/08* | (2006.01) |

(56) References Cited

U.S. PATENT DOCUMENTS

| | | | | |
|---|---|---|---|---|
| 11,608,641 | B2 * | 3/2023 | Liu | E04F 11/17 |
| 2008/0169158 | A1 * | 7/2008 | Lam | B66F 7/14<br>187/211 |
| 2011/0127113 | A1 * | 6/2011 | Vanderburgh | E04F 11/1041<br>187/200 |
| 2013/0168189 | A1 * | 7/2013 | Ribas | B66B 9/0869<br>187/200 |
| 2020/0149285 | A1 * | 5/2020 | Liu | E04F 11/17 |
| 2021/0061617 | A1 * | 3/2021 | Lupher | B66B 9/0869 |
| 2021/0277661 | A1 * | 9/2021 | Liu | E04F 11/1863 |
| 2022/0063960 | A1 * | 3/2022 | Lupher | G06V 20/52 |
| 2023/0257232 | A1 * | 8/2023 | Shum | B66B 9/0869<br>187/200 |

FOREIGN PATENT DOCUMENTS

| | | | |
|---|---|---|---|
| DE | 20 2014 006 021 | U1 | 4/2015 |
| KR | 10-0937044 | B1 | 1/2010 |
| KR | 10-1023523 | B1 | 3/2011 |
| WO | WO 2018/217843 | A1 | 11/2018 |

OTHER PUBLICATIONS

French Preliminary Search Report issued on Jun. 3, 2021 in French application 20 10599 filed on Oct. 16, 2020 , (with English Translation of Categories of Cited Documents), 3 pages.

* cited by examiner

STAIRCASE WITH INSTRUMENTED STEPS WITH LIFTING ACTUATOR FOR ASSISTED ASCENT OR DESCENT

TECHNICAL FIELD

The present invention relates to the field of staircases with steps for assisted movement of individuals.

The present invention principally aims to improve the instrumented and motorized steps of the prior art, in particular in order to assist a user (with or without medical conditions) to move from one story to another, taking into account the characteristics of their gait and their balance.

PRIOR ART

In order to assist movement from one story to another, in addition to elevators, mechanical staircases also referred to as moving staircases or escalators are known.

An escalator is a lifting conveyor suitable for conveying people, consisting of a staircase the mobile steps of which are mechanically driven while constantly remaining in a horizontal plane.

For a small number of stories, the advantages of an escalator compared with an elevator are direct embarkation without waiting, and improved flow of people in busy periods.

Escalators are heavy, costly installations, and are systematically used in places where the change in level is already significant.

In addition, they are not really suitable for people with reduced mobility.

KR101023523B1 and KR100937044B1 disclose staircase systems with separate instrumented and motorized steps, the purpose of which is to facilitate ascent or descent by people with reduced mobility (people with disabilities, children, etc.). Each of the steps of the staircases described comprises a presence detector using weight measurement and an actuator making it possible to raise or lower the step in question to the level of the adjacent step. The systems disclosed do not detect the characteristic of the user's gait, or take into account the potential imbalance caused by the raising of the steps. In particular, the systems do not adjust to the speed of movement of the user (whether or not they have disabilities). A system according to these patents are therefore intrinsically usable by a person without disabilities, but does not adjust to their specific characteristics.

There is a need to improve staircase systems with steps for assisted movement, more particularly so that they adjust optimally to any user, with or without disabilities, in particular if they change their gait during the movement.

The general aim of the invention is to at least partially meet this need.

DISCLOSURE OF THE INVENTION

To this end, the invention firstly relates to a system for assisted ascent or descent, comprising:

- a staircase comprising at least one instrumented mobile step, provided with at least one sensor for measuring the center of pressure of a user and at least one lifting actuator capable of raising or lowering the step according to a vertical degree of freedom;
- a calculation unit connected to the sensor for measuring the center of pressure and the lifting actuator, the calculation unit being configured to calculate at least the position, the speed of movement and the acceleration of the user on the basis of the center of pressure measured by the sensor and, as a function of the calculated values, control the lifting actuator. Here and in the context of the invention, "center of pressure" is given to mean the dynamic point characteristic of contact between the surface of a step of the staircase and a foot of the user.

The staircase can comprise a plurality of instrumented mobile steps adjacent to each other, the calculation unit being configured to control each lifting actuator independently of the others.

Advantageously, the system further comprises at least two fixed steps each instrumented with at least one sensor for measuring the center of pressure of the user, each of the two fixed steps respectively defining the upper and lower stories between which the staircase is arranged.

According to one advantageous variant embodiment, the sensor for measuring the center of pressure is a so-called six-axis force sensor, capable of measuring forces on six axes (Fx, Fy, Fz, Mx, My, Mz). A six-axis sensor makes it possible to measure a complete force torsor, namely the three force components (Fx, Fy, Fz) and the three moment components (Mx, My, Mz) exerted by a user's foot on an instrumented step according to the invention.

According to one advantageous embodiment, the system further comprises at least one sensor for measuring the center of mass connected to the calculation unit, said unit further being configured to compare the measurement of the center of mass of the user to the measurement of the center of pressure, deduce therefrom whether or not the user is imbalanced and, as a function of this comparison, control the lifting actuator.

Here and in the context of the invention, "center of mass" is given to mean the geometric point corresponding to the mean value of the mass distribution of a user in space.

Preferably, the sensor for measuring the center of mass is arranged near the staircase.

With respect to the center of mass measurement, this can alternatively be carried out by placing sensors on the user or the equipment used by them.

According to this alternative, the sensor for measuring the center of mass is preferably one or more cameras or stereoscopic devices.

A first solution can thus consist of arranging specific markers on different parts of the user's body in order to define precise points of a "digital skeleton". The distribution of the masses of the user's limbs, and therefore the center of mass, can be estimated from the position of these points, which is extracted from the video streams from the stereoscopic cameras.

A second solution consists of arranging inertial units on characteristic points of the user, coupled to a "digital skeleton". The element measured by these inertial units is the position of each limb by two-step integration of the acceleration measurements.

According to another advantageous embodiment, the calculation unit incorporates a learning algorithm capable of acquiring the characteristics of a given user's gait from the measurements of the center of pressure sensor, and if applicable of the sensor for measuring the center of mass, recognizing the user and adjusting the control of each lifting actuator as a function of the recognition made.

The invention thus essentially relates to a system comprising a staircase with instrumented step(s) for measuring the center of pressure and preferably the center of mass of a user whose information is centralized within a calculation unit which, on the basis of the measurement signals, controls the lifting actuators present in each step of the staircase on the basis of its embedded algorithm.

Taking into account the derivatives of the position of the center of pressure makes it possible to adjust the speed at which the steps are lifted in order to adapt to the user, in particular if they change their gait during the movement.

Each actuator is controlled as a function of the user's position on the staircase and their speed of movement, deduced from measured center of pressure, and preferably the potential imbalance through the center of mass measurement.

The very precise control of the lifting actuators, governed by the knowledge of the center of pressure and preferably of the center of mass, makes it possible either to help people with reduced mobility to take the stairs or to provide the feeling of walking on level ground for people without disabilities, without imbalance.

With a system according to the invention, the height to which a user must lift their legs to move from a lower story to a higher story is significantly reduced, typically between 0 and 25 cm, while ensuring the walking speed, typically between 0 and 2 m/s on the horizontal, of the user.

The invention also relates to the use of the assistance system described above to detect a fall of the user and in response to this detection, send an alert to a remote server connected to the system.

In order to detect a fall, the calculation unit is advantageously capable of analyzing the trajectories of the center of pressure and detecting a prolonged double stance on two separate steps or on a single step, that is, a stance that lasts longer than a predetermined duration.

The invention also relates to the use of the assistance system described above to detect a unipedal phase followed by a bipedal phase, corresponding to a potential fall of a user by tripping and, in response to the detection, immobilize the steps of the staircase or at the very least reduce their lifting speed.

The invention also relates to the use of the assistance system described above to detect the deterioration of a user's gait.

Further advantages and features will become more clearly apparent on reading the detailed description given by way of non-limiting illustration, with reference to the following figures.

DETAILED DESCRIPTION

Throughout the present application, the terms "bottom", "top", "below", "above", "lower" and "upper" should be understood by reference to the arrangement of a staircase according to the invention between two stories.

Figure 1:
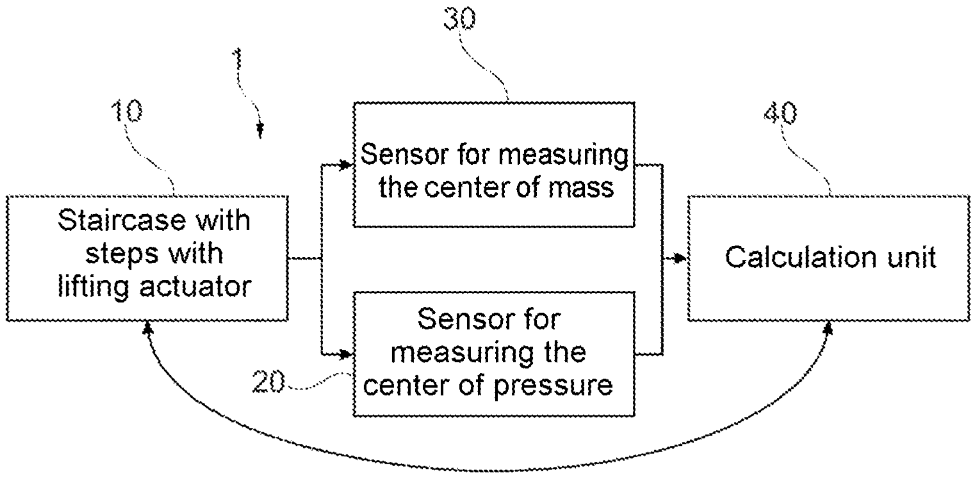
FIG. 1 is a block diagram of an instrumented staircase system according to the invention.

FIG. 1 shows a block diagram of a system 1 for assisted ascent or descent according to the invention.

First of all, the system 1 comprises a staircase 10 with steps that are each mobile between a bottom end position and a top end position. The movement of each step is provided by a lifting actuator incorporated into the step as set out in detail below.

The system also comprises an instrument 20 capable of measuring the position of the center of pressure of the user and all of its derivatives on each step of the staircase, and an instrument 30 capable of measuring the center of mass of the user (and all of its derivatives).

A calculation unit 40 adjusts the control of each lifting actuator of the steps as a function of the user's position on the staircase and their speed of movement, deduced from the center of pressure measured, and the potential imbalance through the center of mass measurement.

The calculation unit 40 can further check, when a user is present on the staircase 10, that they are well balanced relative to a previously created data log and/or database.

The algorithm embedded in the calculation unit 40, preferably generated by learning, can thus verify that the center of pressure/center of mass relationship ensures the balance of the user. If an imbalance is observed, the system 1 makes it possible to detect that the user has fallen.

Figure 2:
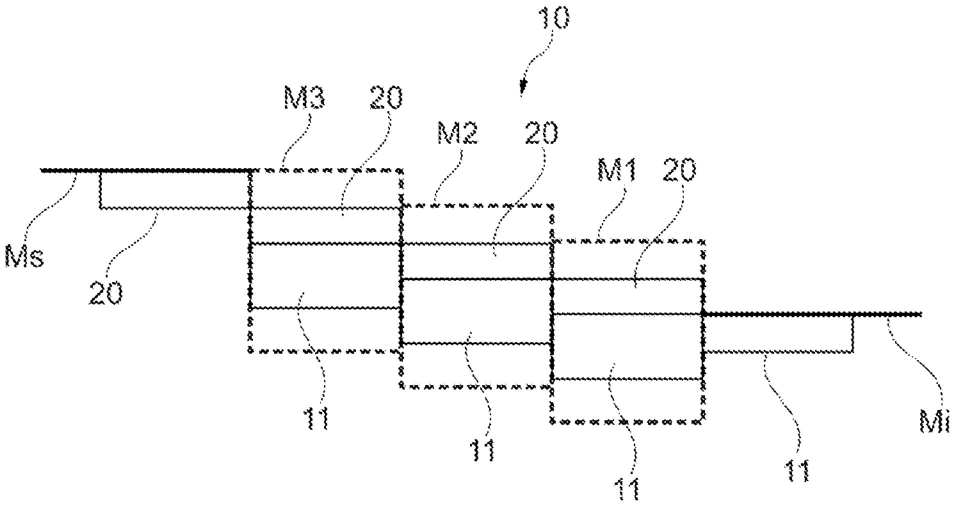
FIG. 2 is a schematic view of an example of an instrumented staircase with lifting actuator according to the invention.

FIG. 2 is a schematic view of an example of a staircase 10. Here, the staircase comprises three instrumented steps M1, M2, M3, which are adjacent and movably mounted along a path shown in dashed lines in FIG. 2, between a bottom end position and a top end position. In order for each step M1 to M3 to move, they incorporate a lifting actuator 11. The function of a lifting actuator 11 is thus to raise a step M1 to M3 vertically along a path that allows it to be positioned level with an adjacent step.

In addition, each of the steps M1 to M3 is provided with a six-axis force sensor, with reference sign 20, that makes it possible to refer to the position of the center of pressure of a user on each step, as set out in detail below.

The going of the steps M1 to M3 is typically between 20 and 30 cm.

The upstream Mi and downstream Ms steps of the staircase that respectively define the lower story and the upper story are fixed, but they are also each instrumented by means of a six-axis force sensor. The function of these two steps Mi, Ms is to measure the user's gait, in order to predict their movement either on ascent or descent of the staircase 10. In other words, when a user approaches, upstream or downstream of the staircase 10, the measurement sensors 20, 30 record the characteristics of the center of pressure and mass, for example the positions, speeds, history, accelerations in space, in order to initiate the controlled movement of the steps M1 to M3.

Figure 3:
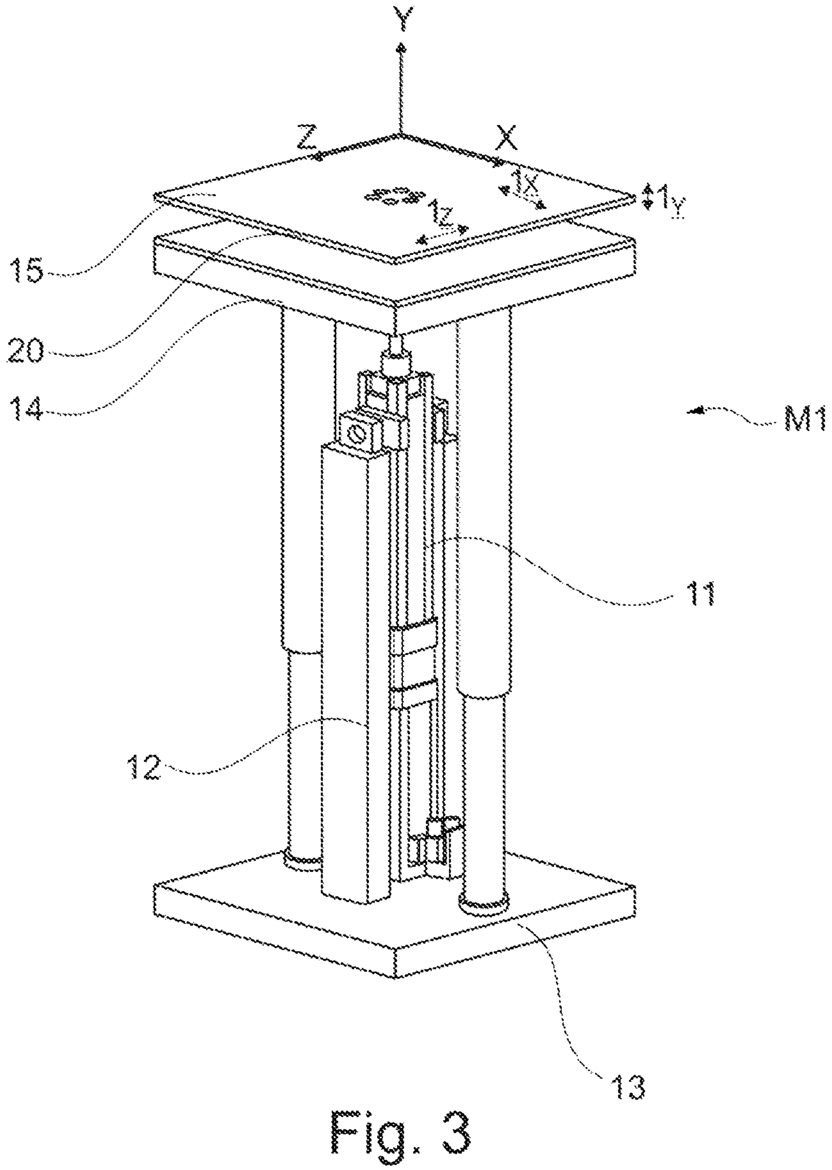
FIG. 3 is a perspective schematic view of an embodiment of an instrumented step according to the invention incorporating a six-axis force sensor and an electric cylinder as a lifting actuator.

An example of an instrumented and motorized step M1 according to the invention is illustrated in FIG. 3.

Here, the lifting actuator is an electric cylinder 11 arranged with its support 12 between a base 13 and an interface plate 14. The cylinder 11 and its support 12 are fastened to the base 13 and the rod of the cylinder 11 is fastened to the connecting plate 14, which provides the vertical movement of the step.

The six-axis force sensor 20 is arranged between a user interface plate 15 and the connecting plate 14.

By way of example, an electric cylinder 11 can have a maximum vertical speed of movement of 1 m/s for a load of 100 kg.

As shown by means of symbols in FIG. 3, the sensor 20 makes it possible to measure the forces along the X, Y and Z axes and the moments about each of these axes. The deformations taken into consideration along each of these axes are also represented by the symbols lx, ly, lz respectively.

How the center of pressure on a step is determined by a six-axis force sensor 20 will now be described in detail.

A step M1 to M3 is considered to be rigid, that is, it undergoes negligible deformation under load, lz being constant.

The force of the user on the interface plate 15 is a pure resultant, that is, not a moment resultant at the center of pressure. As a result, hereinafter, Lext=Mext=Next=0.

According to the fundamental principle of dynamics applied to a step, the sum of the torsors on a given step M1, M2 or M3 can be written as:

$$\mathcal{D}(\text{step}/0)G_{step}=\{\mathcal{T}(\text{Weight/step}\}G_{step}+\{\mathcal{T}(\text{Ext/step}\}M+\{\mathcal{T}(\text{sensor/step}\}P$$

where:

- $\mathcal{D}(\text{step}/0)G_{step}$: Dynamic torsor of the step relative to the fixed reference frame 0 at point $G_{step}$,
- $\{\mathcal{T}(\text{Weight/step}\}G_{step}$: Static torsor of the weight on the step at point $G_{step}$,
- $\{\mathcal{T}(\text{Ext/step}\}M$: Static torsor of the forces of the user on the step at point M,
- $\{\mathcal{T}(\text{sensor/step}\}P$: Static torsor of the forces of the sensor on the step at point P.

All of the equations are reduced to the same point P, the location of the measurement by the six-axis force sensor 20.

With $\overrightarrow{PM}=lx\,\vec{z}+ly\,\vec{y}+lz\,\vec{z}$, the center of pressure is obtained by the parameters lx and ly, the parameter lz being considered by design to be constant and known, as mentioned above (assumption of a rigid step).

The different torsors are written as $$\{\mathcal{T}(\text{Weight/step}\}G_{step}=\begin{Bmatrix}0 & 0\\ -m_{step}*g & 0\\ 0 & 0\end{Bmatrix}G_{step}=\begin{Bmatrix}0 & 0\\ -m_{step}*g & 0\\ 0 & 0\end{Bmatrix}P$$

where $m_{step}$ is the mass of the step and the points $G_{step}$ and P are aligned along the vertical axis y.

$$\{\mathcal{T}(Ext/\text{step}\}G_{step}=\begin{Bmatrix}F_x & L_{ext}\\ F_y & N_{ext}\\ F_z & M_{ext}\end{Bmatrix}M=\begin{Bmatrix}F_xL_{ext}+l_y*F_z-l_Z*F_y\\ F_yM_{ext}+l_z*F_x-l_x*F_z\\ F_zN_{ext}+l_x*F_y-l_y*F_x\end{Bmatrix}P$$

$$\{\mathcal{T}(\text{sensor/step}\}P=\begin{Bmatrix}F_{xsen} & L_{sen}\\ F_{ysen} & N_{sen}\\ F_{zsen} & M_{sen}\end{Bmatrix}P$$

$$\{\mathcal{D}(\text{step}/0\}P=\begin{Bmatrix}0 & 0\\ m_{step}*\ddot{y}_{step} & 0\\ 0 & 0\end{Bmatrix}P$$

that is, the translation of the step along the vertical axis y. The following equations are thus obtained:

$$\begin{cases}0 = F_x+F_{xsen} & (1)\\ m_{step}*\ddot{y}_{step} = -m_{step}*g+F_y+F_{ysen} & (2)\\ 0 = F_z+F_{zsen} & (3)\\ 0 = L_{ext}+l_y*F_z+l_z*F_y+L_{sen} & (4)\\ 0 = M_{ext}+l_z*F_x-l_x*F_z+M_{sen} & (5)\\ 0 = N_{ext}+l_x*F_y-l_y*F_x+N_{sen} & (6)\end{cases}$$

On the basis of equations (1), (2) and (3), the forces Fx, Fy and Fz of the user can be obtained, on a step, given that the other values are known ($m_{step}$, gravity g, acceleration along the y axis) or measurable. In particular, the value of the acceleration of the step corresponds to the acceleration applied by the electric cylinder 11, which is a known value as it is imposed when the actuator is controlled.

The system of equations (4), (5) and (6) makes it possible to determine the values lx and ly as lz is considered to be constant and the moments created by the user are considered to be negligible (Lext, Mext and Next equal to 0).

Ultimately, there are therefore three equations for two unknowns, and the last equation makes it possible to check that the value of lz is indeed the constant selected.

The acquisition module of the calculation unit 40 logs this measurement of lx and ly.

The calculation unit 40 can thus record the distance traveled, through an integration of the signal of the movement, determine the speed of movement (1st derivative), and determine the acceleration of movement (2nd derivative).

A camera or stereoscopic device is arranged near the staircase and can thus estimate the position of the center of mass of the user.

FIGS. 4A to 4D illustrate the operation of a system 1 according to the invention for the ascent of a staircase 10 by a user.

Figure 4A:
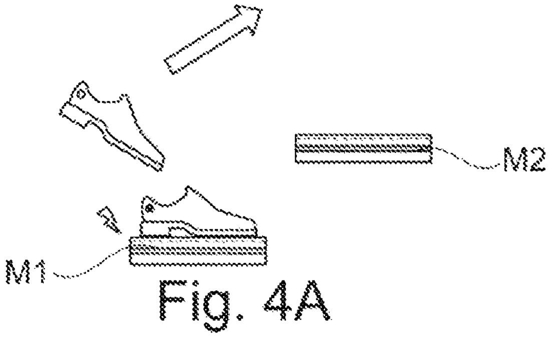
FIG. 4A is a schematic view illustrating a first stage of ascent of a user between two adjacent instrumented steps assisted by a system according to the invention.

The presence of the user is initially detected on a lower step M1 (FIG. 4A).

Figure 4B:
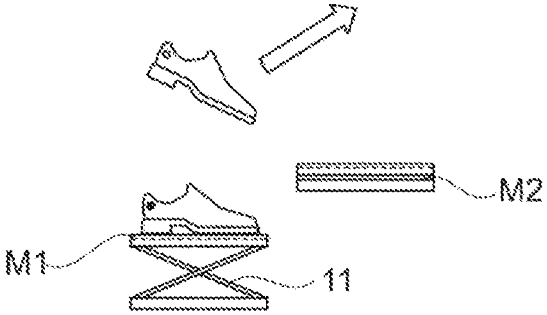
FIG. 4B is a schematic view illustrating the second stage of ascent of a user between two adjacent instrumented steps assisted by a system according to the invention.
Figure 4C:
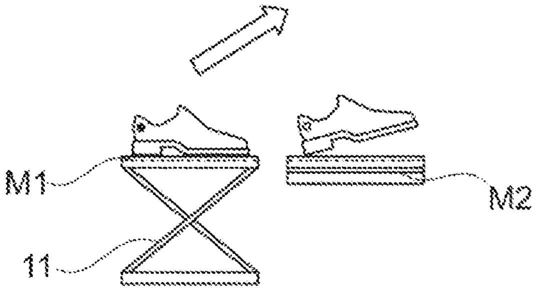
FIG. 4C is a schematic view illustrating the third stage of ascent of a user between two adjacent instrumented steps assisted by a system according to the invention.

When the user places their foot on this step M1 and starts their ascent, the actuator 11 raises this step M1 and the actuator 11 of the adjacent upper step M2 lowers it to the same level (FIGS. 4B, 4C).

Figure 4D:
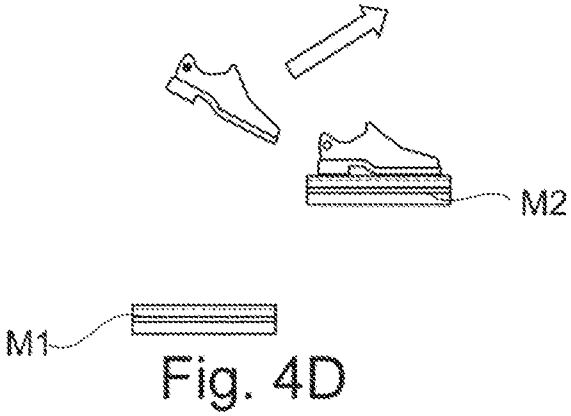
FIG. 4D is a schematic view illustrating the fourth stage of ascent of a user between two adjacent instrumented steps assisted by a system according to the invention.

Once the user has transferred their center of pressure to the step M2, the operation is repeated with the following steps M2, M3 until the upper story Ms is reached (FIG. 4D). Unladen step M1 is returned to its initial position.

FIGS. 5A to 5D illustrate the operation of a system 1 according to the invention for the descent of a staircase 10 by a user.

Figure 5A:
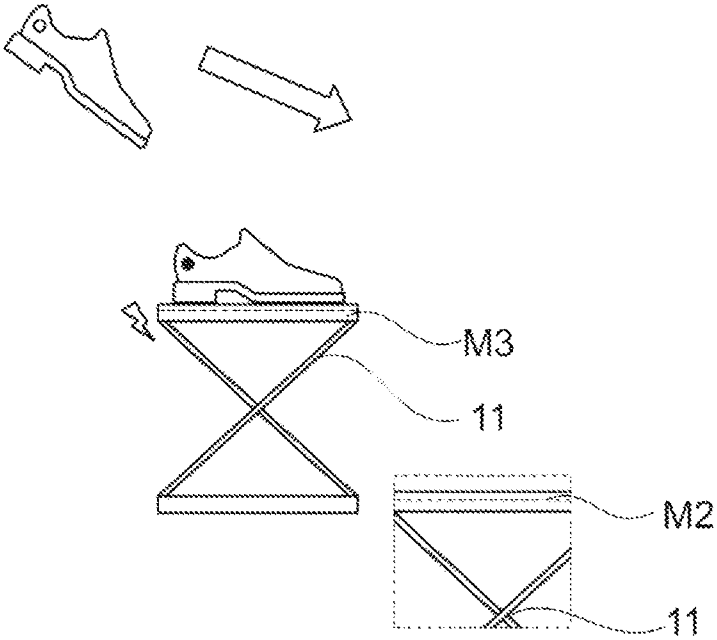
FIG. 5A is a schematic view illustrating a first stage of descent of a user between two adjacent instrumented steps assisted by a system according to the invention.

The presence of the user is initially detected on an upper step M3 (FIG. 5A).

Figure 5B:
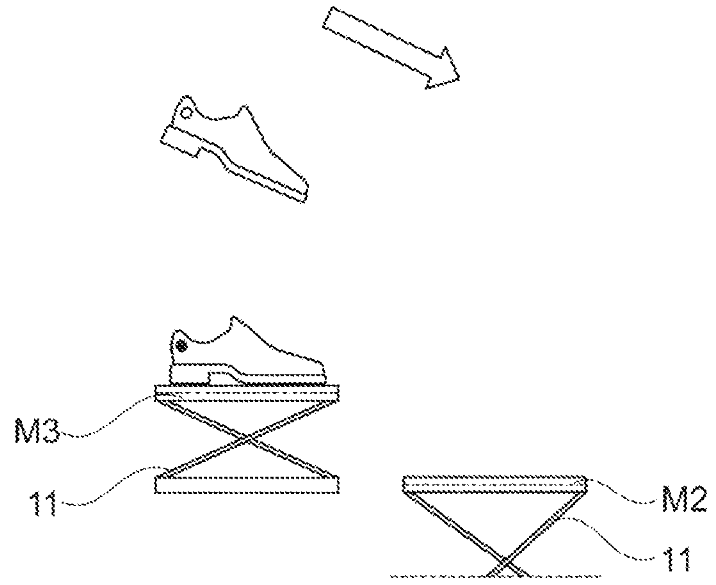
FIG. 5B is a schematic view illustrating the second stage of descent of a user between two adjacent instrumented steps assisted by a system according to the invention.
Figure 5C:
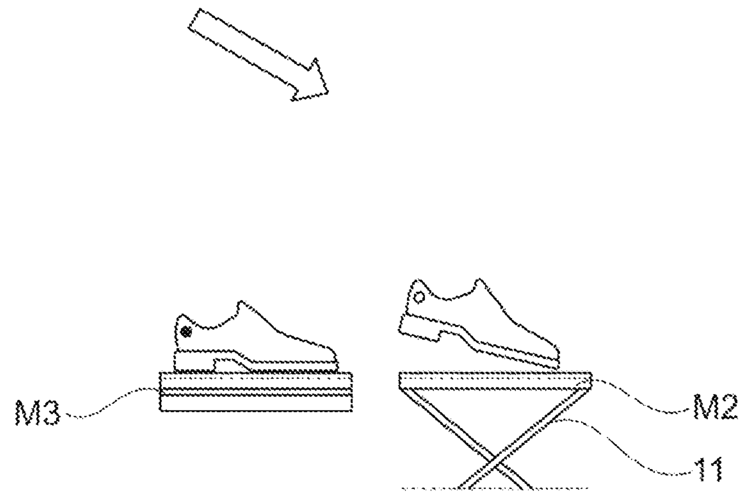
FIG. 5C is a schematic view illustrating the third stage of descent of a user between two adjacent instrumented steps assisted by a system according to the invention.
Figure 5D:
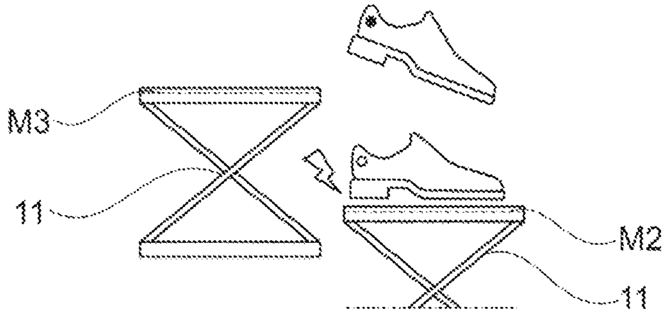
FIG. 5D is a schematic view illustrating the fourth stage of descent of a user between two adjacent instrumented steps assisted by a system according to the invention.

When the user places their foot on this step M3 and starts their descent, the actuator 11 lowers this step M3 and the actuator 11 of the adjacent lower step M2 raises it to the same level (FIGS. 5B, 5C).

Once the user has transferred their center of pressure to the step M2, the operation is repeated with the following steps M2, M1 until the lower story Mi is reached (FIG. 4D). Unladen step M3 is lowered to its bottom end position again.

With the system according to the invention, it is possible to detect situations of potential falls of a user by tripping and actively provide a response.

This detection can take place through the recognition of two balance recovery strategies, which are characterized by protective steps by the user.

Thus, when there is a trip, which is a situation in which the user's swing foot comes into contact with an obstacle, the user can adopt a first so-called "elevating" strategy. In this situation, the foot that has come into contact with the obstacle will perform a lift-off phase, in order to move over the obstacle. Following this strategy, the user returns to a bipedal stance on a single step.

The second strategy is known as "lowering". When the swing foot and the obstacle collide, the user returns his swing foot to the ground, in order to return to a bipedal stance.

Figure 6:
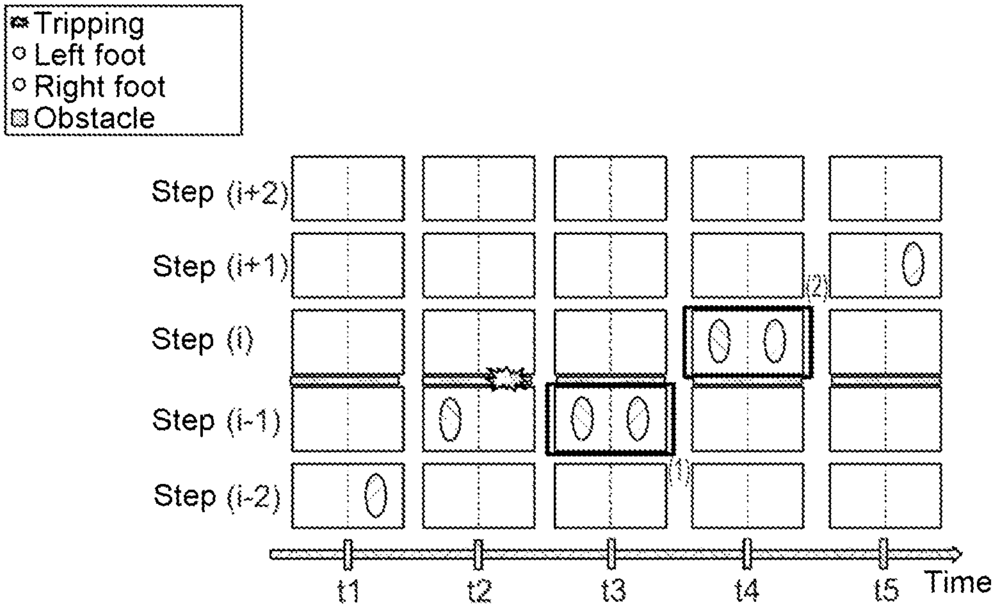
FIG. 6 is a schematic view illustrating a first situation in which a user is at risk of falling by tripping following a collision with an obstacle, the system according to the invention being capable of detecting and responding to this first situation.

With the system according to the invention, and on the basis of the measurement of the center of pressure, it is possible to distinguish between the unipedal stance (on one foot) and bipedal stance (on two feet) phases. This is carried out by locating the center of pressure relative to the sagittal plane of the user and measuring the speed of movement of the center of pressure. When a unipedal stance phase followed by a bipedal stance phase is detected on a single step, it is possible to detect the lowering protective step strategy and therefore potential imbalance. This situation is shown in FIG. 6.

Figure 7:
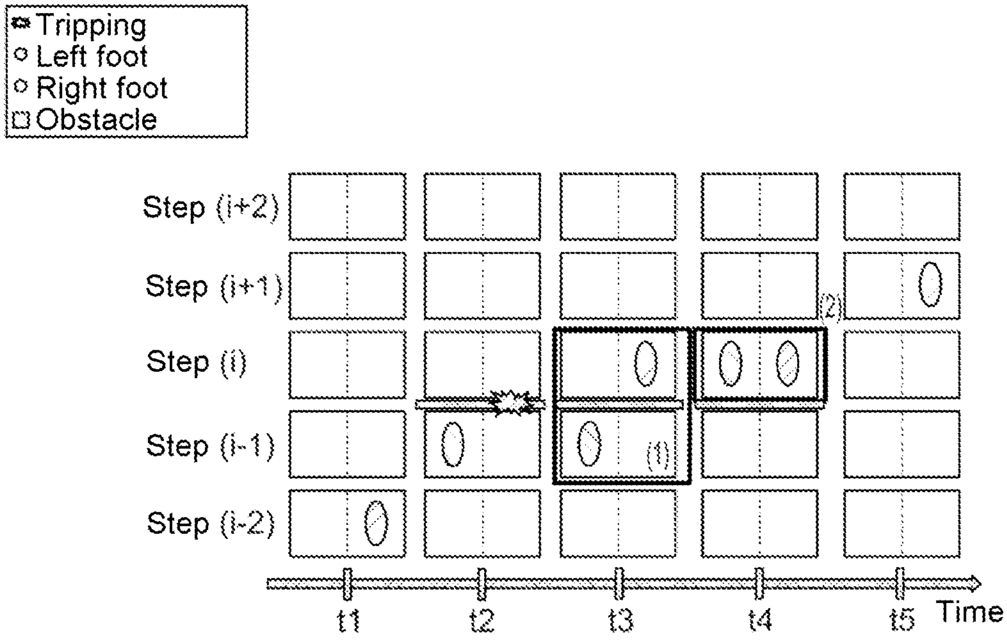
FIG. 7 is a schematic view illustrating a second situation in which a user is at risk of falling by tripping following a collision with an obstacle, the system according to the invention being capable of detecting and responding to this second situation.

When a unipedal stance phase followed by a bipedal stance phase is detected on two consecutive steps, it is possible to detect the elevating strategy. This situation is shown in FIG. 7.

Following the detection of one or the other strategy, the system can immobilize the mechanism, that is, not generate the lifting of the staircase steps, so as not to perturb the user or to significantly reduce, for example by a factor of 10, the speed of travel of the staircase steps.

The invention is not limited to the examples that have just been described; in particular, features of the examples illustrated can be combined within variants that are not illustrated. Other variants and improvements can be envisaged without departing from the scope of the invention.

For example, although in the example illustrated the staircase 10 comprises three instrumented steps motorized by means of a lifting actuator, any number of steps starting from a single instrumented and motorized step can be envisaged.

The invention claimed is:

1. A system for assisted ascent or descent, comprising:

a staircase comprising at least one instrumented mobile step, provided with at least one sensor for measuring a center of pressure of a user and at least one lifting actuator capable of raising or lowering the step according to a vertical degree of freedom;

a calculation unit connected to the sensor for measuring the center of pressure and the lifting actuator, the calculation unit being configured to calculate at least a position, a speed of movement and an acceleration of the user on the basis of the center of pressure measured by the sensor and, as a function of the calculated values, control the lifting actuator; the system further comprising at least one sensor for measuring a center of mass connected to the calculation unit, said unit further being configured to compare the measurement of the center of mass of the user to the measurement of the center of pressure, deduce therefrom whether the user is imbalanced and, as a function of this comparison, control the lifting actuator.

2. The assistance system as claimed in claim 1, wherein the staircase comprises a plurality of instrumented mobile steps adjacent to each other, the calculation unit being configured to control each lifting actuator independently of the others.

3. The assistance system as claimed in claim 1, further comprising at least two fixed steps each instrumented with at least one sensor for measuring the center of pressure of the user, each of the two fixed steps respectively defining the upper and lower stories between which the staircase is arranged.

4. The assistance system as claimed in claim 1, wherein the sensor for measuring the center of pressure is a six-axis force sensor, capable of measuring forces on six axes (Fx, Fy, Fz, Mx, My, Mz).

5. The assistance system as claimed in claim 1, wherein the sensor for measuring the center of mass is arranged near the staircase.

6. The assistance system as claimed in claim 5, wherein the sensor for measuring the center of mass is a camera or a stereoscopic device.

7. The assistance system as claimed in claim 1, wherein the calculation unit incorporates a learning algorithm capable of acquiring characteristics of a given user's gait from the measurements of the center of pressure sensor, and if applicable of the sensor for measuring the center of mass, recognizing the user and adjusting the control of each lifting actuator as a function of the recognition made.

8. The use of the assistance system as claimed in claim 1 to detect a fall of the user and in response to this detection, send an alert to a remote server connected to the system.

9. The use of the assistance system as claimed in claim 1 to detect a unipedal phase followed by a bipedal phase, corresponding to a potential fall of a user by tripping and, in response to the detection, immobilize the steps of the staircase or reduce their lifting speed.

10. The use of the assistance system as claimed in claim 1 to detect the deterioration of a user's gait.

* * * * *